US009722911B2

(12) United States Patent
Retana (10) Patent No.: US 9,722,911 B2
(45) Date of Patent: Aug. 1, 2017

(54) SIGNALING EXISTENCE OF A NETWORK NODE THAT IS IN A REDUCED-POWER MODE (71) Applicant: HEWLETT-PACKARD DEVELOPMENT COMPANY, L.P., Houston, TX (US)

(72) Inventor: Alvaro Enrique Retana, Raleigh, NC (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 0 days.

(21) Appl. No.: 14/415,577

(22) PCT Filed: Oct. 31, 2012

(86) PCT No.: PCT/US2012/062758
§ 371 (c)(1),
(2) Date: Jan. 17, 2015

(87) PCT Pub. No.: WO2014/070164
PCT Pub. Date: May 8, 2014

(65) Prior Publication Data
US 2015/0281041 A1 Oct. 1, 2015

(51) Int. Cl.
H04L 12/721 (2013.01)
H04L 12/12 (2006.01)
(Continued)

(52) U.S. Cl.
CPC ............. H04L 45/12 (2013.01); H04L 12/12 (2013.01); H04L 41/0833 (2013.01);
(Continued)

(58) Field of Classification Search
CPC ......... H04L 45/12; H04L 45/22; H04L 45/02; H04L 41/0833; H04L 12/12; Y02B 60/34
See application file for complete search history.

(56) References Cited

U.S. PATENT DOCUMENTS 6,757,836 B1 6/2004 Kumar et al.
7,613,156 B2 * 11/2009 Rittle ................... H04W 8/005
370/331
(Continued)

FOREIGN PATENT DOCUMENTS

CN 1762130 A 4/2006
WO WO-02181427 12/2002
(Continued)

OTHER PUBLICATIONS

"About Wake on Demand and Bonjour Sleep Proxy", http://support.apple.com/en-us/HT201960, 2015.
(Continued)

Primary Examiner — Andrew Lai
Assistant Examiner — Chuong M Nguyen
(74) Attorney, Agent, or Firm — Mannava & Kang, P.C.

(57) ABSTRACT

According to an implementation, a method for signaling that a first network node exists in a network is following entry of the first network node into a reduced power mode includes receiving, in a second network node, an indication that the first network node will enter into the reduced-power mode. The method also includes generating information that signals the existence of the first network node and that the first network node is reachable in the network and communicating the information to the network such that the second network node operates as a proxy advertiser for the first network node following entry of the first network node into the reduced-power mode.

18 Claims, 5 Drawing Sheets (51) Int. Cl.
*H04L 12/24* (2006.01)
*H04L 12/751* (2013.01)
*H04L 12/707* (2013.01)
*H04W 40/00* (2009.01)
*H04L 12/741* (2013.01)

(52) U.S. Cl.
CPC .............. *H04L 45/02* (2013.01); *H04L 45/22* (2013.01); *H04L 45/54* (2013.01); *H04W 40/005* (2013.01); *H04L 45/127* (2013.01); *Y02B 60/50* (2013.01)

(56) References Cited

U.S. PATENT DOCUMENTS

| | | | | |
|---|---|---|---|---|
| 8,072,999 | B1* | 12/2011 | Cline | ............ H04L 12/437 370/431 |
| 2002/0181427 | A1 | 12/2002 | Sparr et al. | |
| 2002/0183869 | A1 | 12/2002 | Chaiken et al. | |
| 2004/0203385 | A1* | 10/2004 | Narayanan | .......... H04W 76/022 455/41.2 |
| 2006/0133264 | A1 | 6/2006 | Yamauchi | |
| 2007/0124608 | A1* | 5/2007 | Knowlson | ............. G06F 1/3215 713/300 |
| 2008/0075011 | A1 | 3/2008 | Mack-Crane et al. | |
| 2008/0198865 | A1* | 8/2008 | Rudnick | ............... H04L 45/124 370/406 |
| 2009/0262642 | A1 | 10/2009 | Van Greunen et al. | |
| 2010/0246492 | A1 | 9/2010 | Scarlatti et al. | |
| 2011/0029659 | A1 | 2/2011 | Shah | |
| 2012/0147884 | A1 | 6/2012 | Yoon et al. | |
| 2012/0320790 | A1* | 12/2012 | Shaffer | ............... H04W 40/246 370/254 |

FOREIGN PATENT DOCUMENTS

| | | |
|---|---|---|
| WO | WO-2006133264 | 6/2006 |
| WO | WO-2008075011 | 3/2008 |
| WO | WO-2009262642 | 10/2009 |
| WO | WO-2010246492 | 9/2010 |
| WO | WO-2011/159985 A1 | 12/2011 |
| WO | WO-2012/084064 A1 | 6/2012 |

OTHER PUBLICATIONS

Hwang, Joengmin et al., Detecting Phamtom Nodes in Wireless Sensor Networks, 2007.
Östmark, Åke, et al., An infrastructure for service oriented sensor networks, Aug. 2006, pp. 20-29; vol. 1; Issue: 5.
Fossati, T., et al.; "Resource Discovery through Proxies;" Jul. 9, 2012 (Jul. 9, 2012), pp. 1-7, XP015083857, [retrieved on Jul. 9, 2012].
Extended European Search Report, EP Application No. 12887666.1, Date: May 13, 2016, pp. 1-12.
J. Buford et al., "Sleeper: A Power-Conserving Service Discovery Protocol," 3rd International Conference on Mobile and Ubiquitous Systems—Workshops, Jul. 1, 2006, pp. 1-10, IEEE.
Offic Action, CN Application No. 201280075007.9, Date: Jan. 26, 2017, pp. 1-9, SIPO.

* cited by examiner

SIGNALING EXISTENCE OF A NETWORK NODE THAT IS IN A REDUCED-POWER MODE

CROSS-REFERENCE TO RELATED APPLICATION

This application is a national stage application under 35 U.S.C. §371 of PCT/US2012/062758, filed Oct. 31, 2012.

BACKGROUND

In the operation of distributed routing protocols, such as the Open Shortest Path First (OSPF) routing protocol, network nodes, such as routers and switches, maintain independent copies of a network database. The network nodes use the stored information in making network traffic routing decisions. The network nodes generate route advertisements, for instance, at regular intervals of time and/or as changes occur, and broadcast or flood these route advertisements to all of the other network nodes. The respective databases are updated using these route advertisements. When a network node or a port in a network node fails or is otherwise placed into a reduced-power mode, that network node does not generate or broadcast any further advertisements for the network node's port or ports. As a result, the other network nodes are unaware of the existence of the network node or port until the network node or port returns to an active state in which route advertisements by the network node or port are broadcasted again.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element. Moreover, the variable "n" is intended to denote an integer equal to or greater than one.

Disclosed herein are example methods for signaling that a first network node exists in a network following entry of the first network node into a reduced-power mode. Also disclosed herein are example network node managers and example computer readable mediums that are to implement the example methods. Further disclosed herein are example methods for signaling that a port in a network node exists following entry of the port into a reduced-power mode. The reduced-power mode may comprise, for instance, any of a standby mode, a sleep mode, and a powered off mode.

As may generally be known with conventional network operations, some of the ports of network nodes and some of the network nodes themselves may be placed into a reduced-power mode at various times as part of an effort to substantially maximize energy efficiency in operating the network. In conventional networks, when the ports and/or the network nodes are placed into the reduced-power mode, the other network nodes are unaware of the existence of the ports and/or the network nodes. Instead, the other network nodes only learn of the existence of these ports and/or network nodes after these ports and/or network nodes are returned to an active mode and thus begin issuing route advertisements again. In other instances, a central controller is required to maintain identifications of the ports and/or network nodes when the ports and/or network nodes are in the reduced-power mode.

Generally speaking, the example methods disclosed herein enable the network nodes in a network to maintain an identification of port(s) and/or network node(s) after the port(s) and/or network node(s) have entered into a reduced-power mode in addition, the network nodes are able to maintain the identification of the port(s) and/or network node(s) without requiring that this information be obtained from a central controller and thus, the example methods disclosed herein enable a redundant and distributed technique for maintaining this information. Moreover, the example methods disclosed herein enable the network nodes in the network to maintain the identification of the port(s) and/or the network node(s) while still complying with the specific routing protocol used, such as the OSPF routing protocol.

In one regard, because the network nodes are aware of the existence of the port(s) and/or network node(s) that are in the reduced-power mode, the network nodes may attempt to forward network traffic through those port(s) and/or network node(s) as conditions in the network require such use. In contrast, when conventional ports and network nodes are in a reduced-power mode, their existence is unknown to the network nodes that are in the active state because those network nodes are not provided any indication of the ports or network nodes that are in the reduced-power mode.

Figure 1:
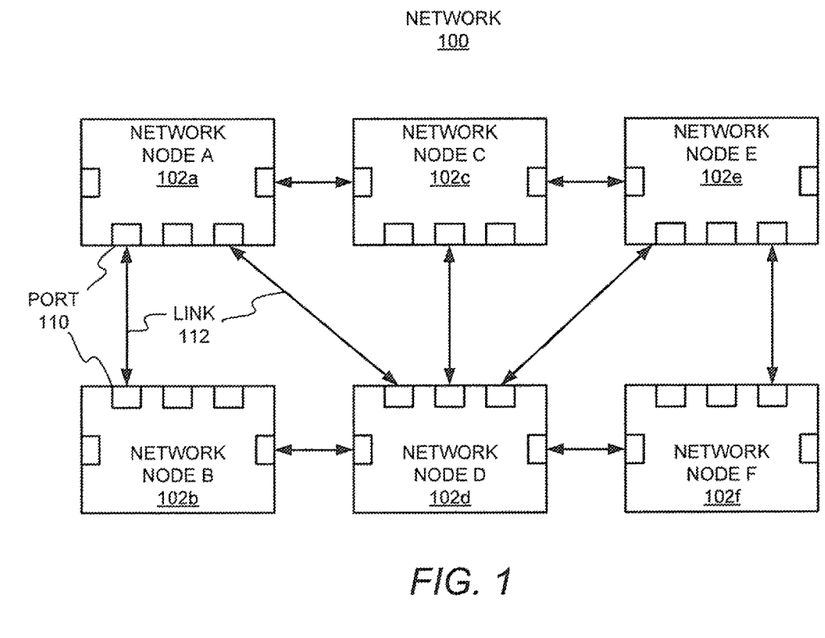
FIG. 1 shows a simplified block diagram of a network including a plurality of network nodes, which are to operate in various manners as discussed herein, according to an example of the present disclosure.

With reference to FIG. 1, there is shown a simplified block diagram of a network 100 including a plurality of network nodes 102a-102f, which are to operate in various manners as discussed herein, according to an example. It should be readily apparent that the diagram depicted in FIG. 1 represents a generalized illustration and that other components may be added or existing components may be removed, modified or rearranged without departing from a scope of the network 100. For instance, the network 100 may include additional network nodes and other components, such as data storage arrays, servers, etc.

The network nodes 102a-102f comprise apparatuses that provide networking functions to a plurality of client devices (not shown) in the network 100. In this regard, the network nodes 102a-102f may comprise switches, routers, hubs, bridges, servers, etc. In this regard, each of the network nodes 102a-102f includes a number of ports 110. In addition, each of the network nodes 102a-102f is connected to respective other ones of the network nodes 102a-102f through respective links 112. Particularly, the links 112 represent local area network (LAN) segments, point-to-point links, etc., between the network nodes 102a-102f. The network nodes 102a-102f may therefore be networked to each other in one of a local area network (LAN), a wide area network (WAN), a metropolitan area network (MAN), etc. Although not shown, at least some of the network nodes 102a-102f may be connected to host computer devices, servers, disk arrays, etc.

As shown in FIG. 1, each of the network nodes 102a-102f has links 112 to at least two other network nodes 102a-102f. In this regard, if any of the ports 110 on a network node 102a-102f or if a network node 102a-102f itself enters into a reduced-power mode or fails, network traffic may continue to be forwarded through the network 100. The reduced-power mode may comprise a mode that results in a reduced amount of power consumption as compared with an active mode, in which the port(s) 110 and/or network node(s) 102a-102f are to forward network traffic in the network 100. In addition, the reduced-power mode may comprise a mode from which the port(s) 110 and/or the network node(s) 102a-102f may be returned to the active mode automatically. Moreover, the reduced-power mode may comprise a mode into which the port(s) 110 and/or the network node(s) 102a-102f enter at a scheduled time and/or when predefined conditions exist in the network 100. By way of example, the reduced-power mode may comprise any of a standby mode, a sleep mode, and a powered off mode. In contrast, a failed mode may comprise a mode that the port(s) 110 and/or the network node(s) 102a-102f enter due to a failure of the port(s) 110 and/or the network node(s) 102a-102f and may thus be unscheduled.

A port 110 of a network node 102a or the network node 102a itself may enter into a reduced-power mode, for instance, in order to reduce energy consumption when the remaining ports 110 and/or network nodes 102b-102f are able to adequately handle the traffic in the network 100. Thus, for instance, the port(s) 110 and/or the network node(s) 102a-102f may enter into the reduced-power mode at a scheduled time, e.g., at night, and may emerge from the reduced-power mode at another scheduled time, e.g., in the morning. As another example, the port(s) 110 and/or the network node(s) 102a-102f may enter into the reduced-power mode when the port(s) 110 and/or the network node(s) 102a-102f are relatively idle.

As discussed in greater detail herein, when the port(s) 110 and/or network node(s) 102a-102f are in the reduced-power mode, their existence in the network 100 is signaled to the other network nodes 102a-102f. According to an example, a subset of the network nodes 102a-102f may enter into the reduced-power mode at any given time. In one regard, for instance, if traffic increases in the network 100 and either or both of the port(s) 110 and the network node(s) 102a-102f are required to be brought back into the active mode, the network node(s) 102a-102f may be aware of their existence and may perform actions that cause the port(s) 110 and/or network node(s) 102a-102f to be returned to the active mode. In contrast, when conventional network nodes are in a reduced-power mode, their existence is unknown to the network nodes that are in the active state because those network nodes are not provided any indication of the network nodes that are in the reduced-power mode.

The existence of the port(s) 110 and/or network node(s) 102a-102f that are in the reduced-power mode may be signaled through various operations individually performed by the network node 102a that is in the reduced-power state or contains a port 110 that is in the reduced-power mode. In addition, in instances in which a first network node 102a is in the reduced-power mode, a second network node 102b is to operate as a proxy advertiser for the first network node 102a. The use of the terms "first network node" and "second network node" in the present disclosure should not be construed as denoting any type of order or limiting the network nodes in any respect. Instead, it should be understood that the terms "first network node" and "second network node" are merely intended to distinguish the network nodes from each other. This is also true for the other manners in which the network nodes are defined as differing from each other.

As discussed in greater detail herein below, the second network node 102b operates as a proxy advertiser for the first network node 102a by identifying the first network node 102a as a phantom node in the network 100, thereby obviating restrictions on the network nodes 102a-102f from advertising node information on behalf of another network node. By way of particular example, the second network node 102b generates an extended route advertisement that indicates that a phantom node is connected to the second network node 102b and that the phantom node is reachable in the network 100 and may therefore comply with conventional routing protocols.

Figure 2:
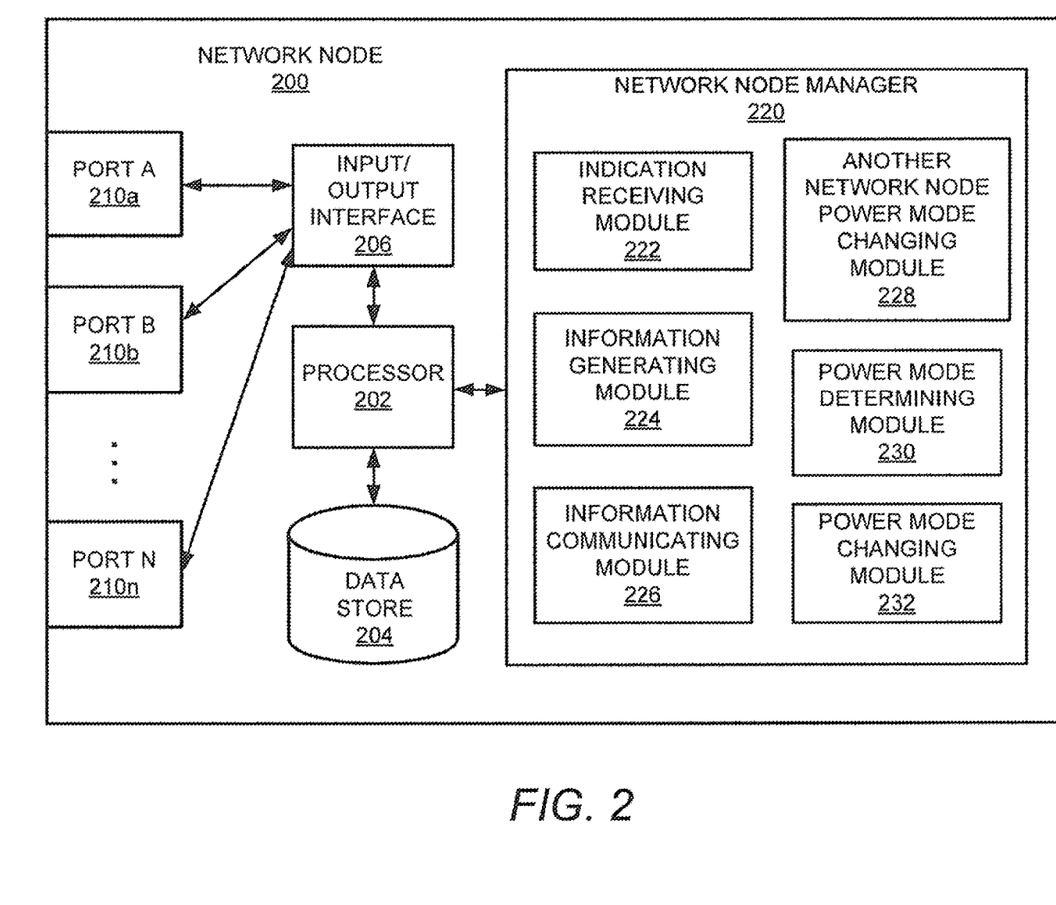
FIG. 2 shows a simplified block diagram of a network node, according to an example of the present disclosure.

Turning now to FIG. 2, there is shown a simplified block diagram of a network node 200, according to an example. It should be readily apparent that the diagram depicted in FIG. 2 represents a generalized illustration and that other components may be added or existing components may be removed, modified or rearranged without departing from a scope of the network node 200 depicted therein.

Generally speaking, the network node 200 may comprise any of the network nodes 102a-102f depicted in FIG. 1. The network node 200 is depicted as including a processor 202, a data store 204, an input/output interface 206, a plurality of ports 210a-210n, and a network node manager 220. The network node manager 220 is also depicted as including an indication receiving module 222, an information generating module 224, an information communicating module 226, another network node power mode changing module 228, a power mode determining module 230, and a power mode changing module 232. The processor 202, which may comprise a microprocessor, a micro-controller, an application specific integrated circuit (ASIC), and the like, is to perform various processing functions in the network node 200. One of the processing functions includes invoking or implementing the modules 222-232 of the network node manager 220 as discussed in greater detail herein below.

According to an example, the network node manager 220 comprises a hardware device, such as, a circuit or multiple circuits arranged on a board. In this example, the modules 222-232 comprise circuit components or individual circuits. According to another example, the network node manager 220 comprises a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. In this example, the modules 222-232 comprise software modules stored in the memory. According to a further example, the modules 222-232 comprise a combination of hardware and software modules.

The input/output interface 206 may comprise a hardware and/or a software interface. In this regard, the input/output interface 206 may comprise either or both of hardware and software components that enable receipt and transmission of data and/or signals. Thus, for instance, the input/output interface 206 comprises an interface to the ports 210a-210n, which may comprise physical ports, such as, Ethernet ports, optical fiber ports, etc., into which cables are to be physically inserted.

In one regard, the processor 202 is to receive packets of data through the ports 210a-210n, to determine which of the ports 210a-210n the packets of data are to be outputted, and output the packets of data through the ports 210a-210n based upon the determination. The processor 202 may perform these operations in any suitable manner and the manners in which these operations are performed are not described in further detail herein. Instead, aspects of the present disclosure are directed to various operations that may be performed to signal the existence of the network node 200 when the network node 200 is in a reduced-power mode. Other aspects of the present disclosure are directed to various operations that may be performed to signal the existence of a port 210a of the network node 200 when the port 210a is in the reduced-power mode. Still other aspects of the present disclosure are directed to various operations that may be performed to signal the existence of another network node to which the network node 200 is in communication.

According to an example, the network node 200 performs the operations disclosed herein without being or having to consult a central controller (not shown) of the network 100. In this regard, aspects of the present disclosure may be performed by peer network nodes and not by a central controller.

In any regard, the processor 202 may store data in the data store 204, which comprises volatile and/or non-volatile memory, such as DRAM, EEPROM, MRAM, phase change RAM (PCRAM), Memristor, flash memory, and the like. In addition, or alternatively, the data store 204 comprises a device that is to read from and write to a removable media, such as, a floppy disk, a CD-ROM, a DVD-ROM, or other optical or magnetic media.

Figure 3:
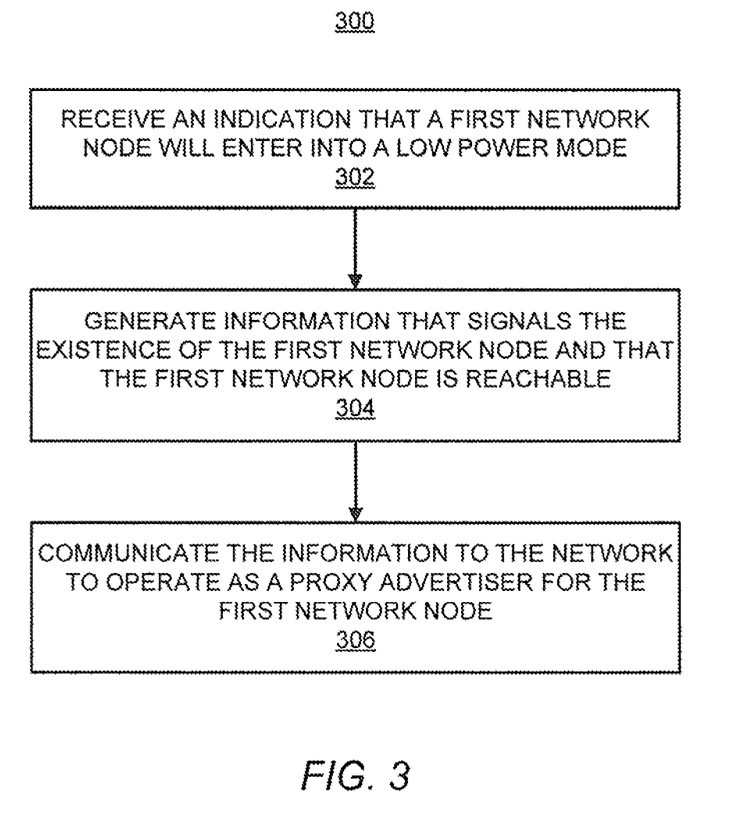
FIG. 3 shows a flow diagram of a method for signaling that a network node exists in a network following entry of the network node into a reduced-power mode, according to an example of the present disclosure.
Figure 4:
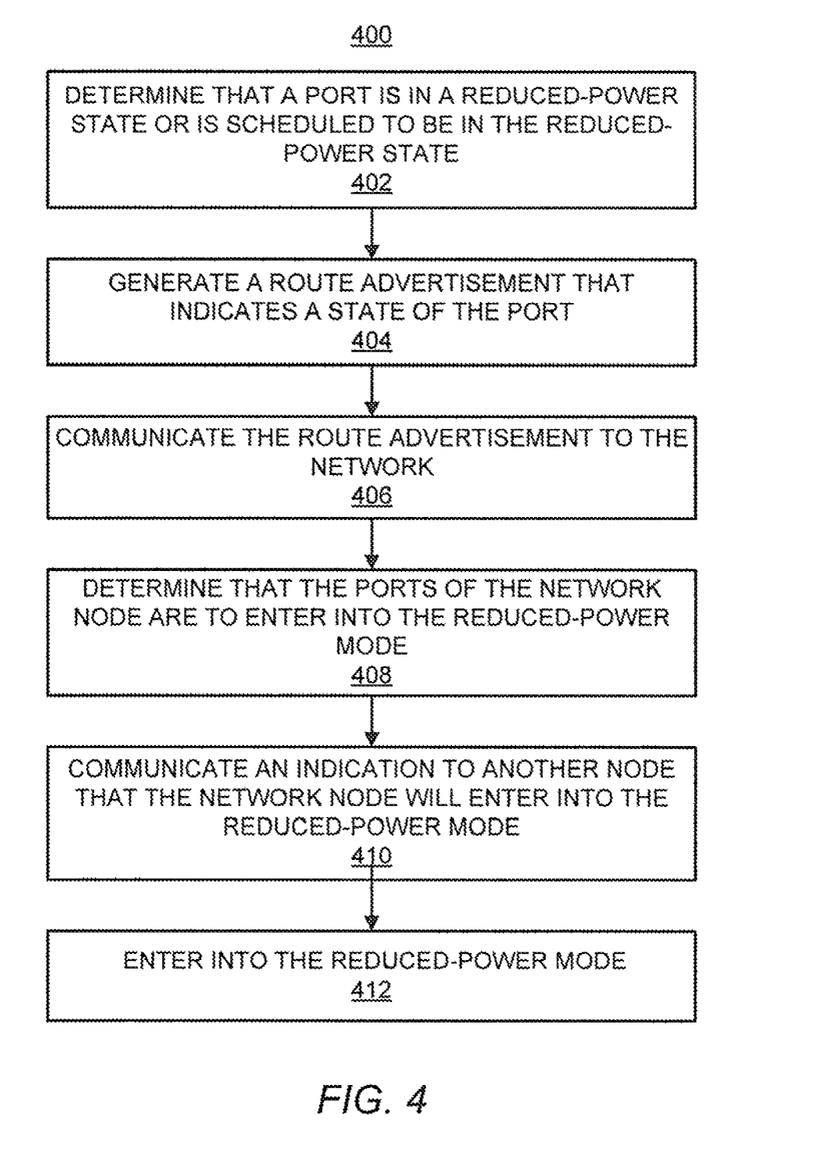
FIG. 4 shows a flow diagram of a method for signaling that a port in a network node exists following entry of the port into a reduced-power mode, according to an example of the present disclosure.

Various manners in which the network node manager 220 may be implemented are discussed in greater detail with respect to the methods 300 and 400 respectively depicted in FIGS. 3 and 4. It should be apparent to those of ordinary skill in the art that the methods 300 and 400 represent generalized illustrations and that other steps may be added or existing steps may be removed, modified or rearranged without departing from scopes of the methods 300 and 400. Although particular reference is made to the network node manager 220 depicted in FIG. 2 as comprising an apparatus and/or a set of machine readable instructions that may perform the operations described in the methods 300 and 400, it should be understood that differently configured apparatuses and/or machine readable instructions may perform the methods 300 and 400 without departing from scopes of the methods 300 and 400.

Generally speaking, FIG. 3 shows a flow diagram of a method 300 for signaling that a network node 200 exists in a network 100 following entry of the network node 200 into a reduced-power mode, according to an example. In addition, FIG. 4 shows a flow diagram of a method 400 for signaling that a port 210a exists in a network node 200 following entry of the port 210a into a reduced-power mode, according to an example. In both methods 300 and 400, the signaling is provided to other network nodes 102a-102f in the network 100 such that the other network nodes 102a-102f are aware of the existence of the port 210a and/or network node 200, even when the port 210a and/or network node 200 is in the reduced-power mode and are thus not actively communicating route advertisements. In the method 300, a network node 200 other than the network node 102a that is either going to be in or is in the reduced-power state may perform the signaling operations. In the method 400, the network node 200 that is or includes a port 210a that is either going to be in or is in the reduced-power state may perform the signaling operations.

With reference first to FIG. 3, at block 302, an indication that a first network node 102a will enter into a reduced-power mode is received in a second network node 200, for instance, by the indication receiving module 222. In this regard, the second network node 200 is in communication with the first network node 102a, either directly or through another network node 102c. In addition, the second network node 200 may receive the indication through one of the ports 210a-210n.

According to an example, the first network node 102a, which may comprise the same or similar elements as the second network node 200, may determine that the first network node 102a is to enter into the reduced-power mode at a future time. The future time may comprise less than a few seconds, a few seconds, a few minutes, etc. In addition, the first network node 102a may determine that it is to enter into the reduced-power mode for any of a variety of reasons. For instance, the first network node 102a may determine that some or all of its ports 110 are not being utilized or are being underutilized in the forwarding of network traffic. In this example, the first network node 102a may be programmed to enter into the reduced-power mode to reduce the total energy consumed by the network nodes 102a-102f.

In any regard, in response to the determination, the first network node 102a may generate the indication that the first network node 102a will enter into the reduced-power mode and may communicate the indication, for instance, as packets of data to the second network node 200 over an active link of the first network node 102a. As such, the second network 200 may receive the indication, from the first network node 102a prior to the first network node 102a entering into the reduced-power mode.

At block 304, information that signals the existence of the first network node 102a and that the first network node 102a is reachable in the network 100 is generated, for instance, by the information generating module 224. For instance, the information comprises a route advertisement for the first network node 102a that includes non-zero-cost links to adjacent network nodes 102b-102f. Thus, for example, the information indicates that the second network node 200 is connected to the first network node 102a, but that the first network node 102a contains only non-zero-cost links.

According to an example, however, instead of directly identifying the first network node 102a and the ports 110 of the first network node 102a in the information, the second network node 200 uses a phantom node to represent the first network node 102a. Generally speaking, the phantom node comprises identifiers, but does not comprise the identifiers of an actual network node in the network 100. Particularly, the second network node 200 generates the information to include an identification of the phantom node and the phantom ports of the phantom node. The identifiers of the phantom node and the phantom ports may comprise any of, for instance, media access control (MAC) addresses, internet protocol (IP) addresses, etc., of the phantom node and the phantom ports. In one regard, the second network node 200 uses the phantom node to represent the first network node 102*a* in the generated information to overcome conventional control plane protocols that are designed to prevent network nodes from advertising information for other network nodes. That is, through the use of the phantom node, the second network node 200 does not appear to be advertising information for the first network node 102*a*.

The second network node 200 may contain data that correlates the identifiers of the phantom node to the identifiers of the first network node 102*a*. In one regard, the other network power mode changing module 228 may use the correlation to cause the first network node 102*a* to emerge from the reduced-power mode to an active mode in response to receipt of an indication that network traffic is to be forwarded through the phantom node. This may occur, for instance, if the currently active network nodes 102*b*-102*f* are unable to adequately handle the network traffic, such as when a network node 102*b* fails, there is an increase in network traffic, etc.

In addition, the information is generated to indicate the existence of the phantom node in the network 100, but that the phantom node is not to be used to forward traffic in the network 100. By way of example, the information is generated to indicate that the ports in the phantom node are undesirable for use in forwarding network traffic. In this example, the information may be generated to indicate that the ports in the phantom node have a very high metric, e.g., a very high bandwidth usage, are highly loaded, etc. In addition, if the first network node 102*a* becomes required, for instance, as network traffic increases, the other network nodes 102*b*-102*f* may call for traffic to be routed through the phantom node, which the other network nodes 102*b*-102*f* identify as being an actual network node in the network 100, regardless of the undesirability of the use of the first network node 102*a*.

At block 306, the information is communicated to the network, i.e., the other network nodes 102*b*-102*f*, such that the second network node 200 operates as a proxy advertiser for the first network node following entry of the first network node into the reduced-power mode, for instance, by the information communicating module 226. Particularly, the information communicating module 226 may be broadcast or flood the information onto the network 100. According to an example, the information is part of a route advertisement of the second network node 200 and is communicated in the same manner and at the same time as the route advertisement. In addition, the network nodes 102*b*-102*f* that receive the information from the second network node 200 may update their databases with the information, in implementing a routing protocol, such as the OSPF routing protocol.

According to an example in which the second network node 200 is also to enter into the reduced-power mode, a third network node 102*b* may implement the method 300 to operate as a proxy advertiser for the second network node 200. In this example, in operating as the proxy advertiser for the second network node 200, the third network node 102*b* may generate and communicate information that identifies a phantom node corresponding to the second network node 200 and a phantom node corresponding to the first network node 102*a*. In this regard, the third network node 102*b* may also operate as a proxy advertiser for the first network node 102*a*.

Turning now to FIG. 4, at block 402, a determination is made that a port 210*a* is at least one of in a reduced-power mode or is scheduled to be in the reduced-power mode, for instance, by the power mode scheduling module 230. This determination may be made based upon, for instance, the amount of network traffic being directed to the port 210*a*. Thus, for instance, the power mode scheduling module 230 may schedule for the port 210*a* to enter into the reduced-power mode when the port 210*a* is idle for a predetermined period of time.

At block 404, a route advertisement that indicates that the port 210*a* is in a mode in which the port 210*a* is not to be used in the flow of traffic in the network 100, but that the port exists in the network node 200 and is reachable is generated, for instance, by the information generating module 224. By way of example, the route advertisement may be generated to include extra information that explicitly identifies the mode, e.g., that the port 210*a* is up, down, under administrative shutdown, in a low-power mode, etc. The extra information may comprise information that is currently unavailable in conventional route advertisements.

At block 406, the route advertisement is communicated to the network 100, for instance, by the information communicating module 226. Particularly, the information communicating module 226 may be broadcast or flood the route advertisement onto the network 100 through another one or all of the remaining ports 210*b*-210*n*.

At block 408, a determination is made that the ports 210*a*-210*n* in the network node 200 are to enter into the reduced-power mode, for instance, by the power mode determining module 230. This determination may be made based upon, for instance, the amount of network traffic being directed through the ports 210*a*-210*n*, Thus, for instance, the power mode scheduling module 230 may schedule for each of the ports 210*a*-210*n* to enter into the reduced-power mode when the ports 210*a*-210*n* are idle for a predetermined period of time. By way of particular example, the power mode determining module 230 may determine that all of the ports 210*a*-210*n* are to enter into the reduced-power mode when all but one of the ports 210*a*-210*n* are in the reduced-power mode. Alternatively, the power mode determining module 230 may determine that the network node 200 is to enter into the reduced-power mode when a predetermined condition has been reached. For instance, the power mode determining module 230 may determine that the network node 200 is to enter into the reduced-power mode at a particular time, when network traffic through the network node 200 fails below a predetermined threshold, upon receipt of a command from a user to enter into the reduced-power mode, etc.

At block 410, an indication that the network node 200 will enter into the reduced-power mode is communicated to another network node 102*a*, for instance, by the information communicating module 226. The another network node 102*a* that is to receive the indication may be selected through any of a plurality of suitable manners. For instance, the another network node 102*a* may comprise the network node 102*a* that is in the closest proximity to the network node 200. As another example, the another network node 102*a* may comprise the network node 102*a* having the highest identification number or the lowest identification number. As a further example, the another network node 102*a* may comprise the least or the most loaded network node 102*a* in the network 100.

At block 412, the network node 200 is entered into the reduced-power mode, for instance, by the power mode changing module 232. The network node 200 may be entered into the reduced-power mode through implementation of any suitable techniques. In addition, the another network node 102a that received the indication communicated at block 410 may implement the method 300 to act as a proxy advertiser for the network node 200 when the network node 200 is in the reduced-power mode.

Some or all of the operations set forth in the methods 300 and 400 may be contained as a utility, program, or subprogram, in any desired computer accessible medium. In addition, the methods 300 and 400 may be embodied by machine readable instructions, which may exist in a variety of forms both active and inactive. For example, they may exist as source code, object code, executable code or other formats. Any of the above may be embodied on a non-transitory computer readable storage medium. Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 5:
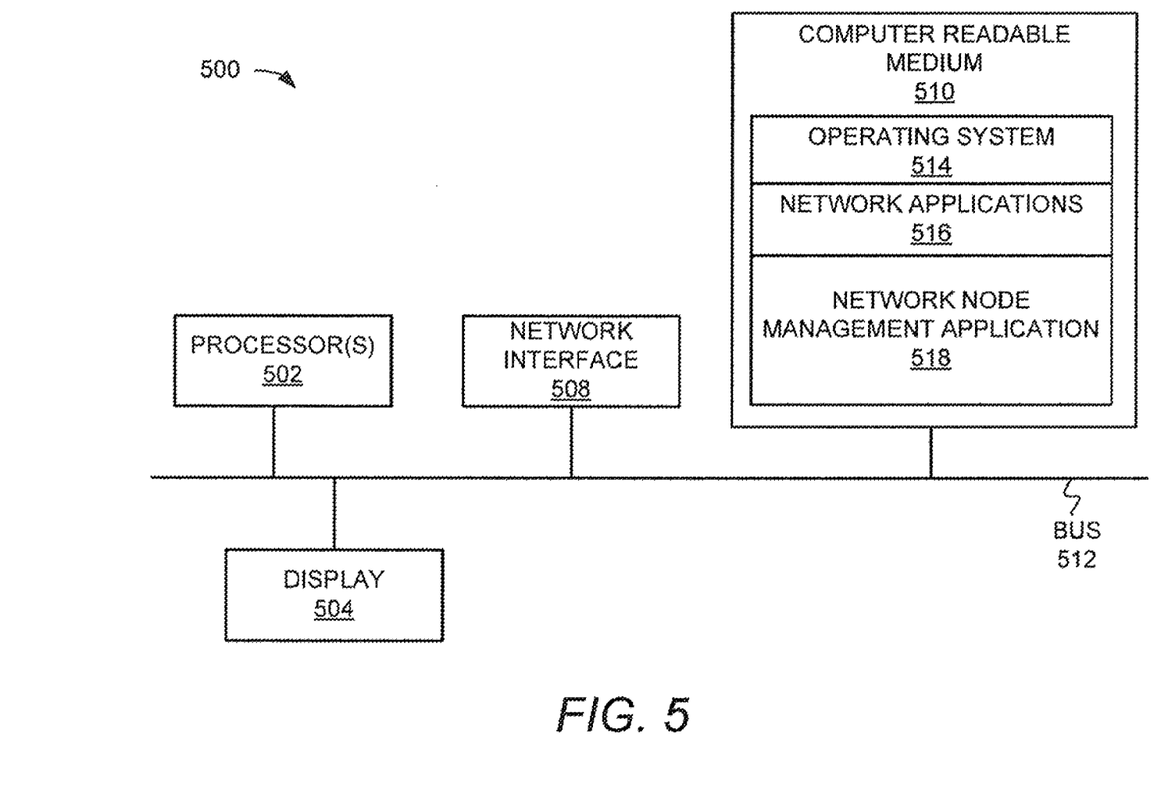
FIG. 5 illustrates a schematic representation of a computing device, which may be employed to perform various functions of the network node manager depicted in FIG. 2, according to an example of the present disclosure.

Turning now to FIG. 5, there is shown a schematic representation of a computing device 500, which may be employed to perform various functions of the network node manager 220 depicted in FIG. 2, according to an example. The computing device 500 includes a processor 502, such as the processor 202; a display 504, such as but not limited to a monitor; a network interface 508, such as but not limited to a Local Area Network LAN, a wireless 802.11x LAN, a 3G/4G mobile WAN or a WiMax WAN; and a computer-readable medium 510. Each of these components is operatively coupled to a bus 512. For example, the bus 512 may be an EISA, a PCI, a USB, a FireWire, a NuBus, or a PDS.

The computer readable medium 510 comprises any suitable medium that participates in providing instructions to the processor 502 for execution. For example, the computer readable medium 510 may be non-volatile media. The operating system 514 may also perform basic tasks such as but not limited to recognizing receipt of packets, transmitting the packets to their destination addresses, and managing traffic on the bus 512. The network applications 516 include various components for establishing and maintaining network connections, such as but not limited to machine readable instructions for implementing communication protocols including TCP/IP, HTTP, Ethernet, USB, and FireWire.

The network node management application 518 provides various components for managing an interface between an application and a network discussed above with respect to the methods 300 and 400 in FIGS. 3 and 4. The network node management application 518 may thus comprise an indication receiving module 222, an information generating module 224, an information communicating module 226, another network node power mode changing module 228, a power mode determining module 230, and a power mode changing module 232.

In certain examples, some or all of the processes performed by the application 518 may be integrated into the operating system 514. In certain examples, the processes may be at least partially implemented in digital electronic circuitry, or in computer hardware, machine readable instructions (including firmware and software), or in any combination thereof, as also discussed above.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for signaling that a first network node exists in a network following entry of the first network node into a reduced-power mode, said method comprising:
   in a second network node,
      receiving an indication that the first network node will enter into the reduced-power mode;
      generating, by a processor, a route advertisement for the first network node that signals the existence of the first network node and that the first network node is reachable in the network, wherein the route advertisement identifies the first network node using an identifier of a third network node that does not exist in the network; and
      communicating the route advertisement to the network such that the second network node operates as a proxy advertiser for the first network node following entry of the first network node into the reduced-power mode.

2. The method according to claim 1, wherein receiving the indication that the first network node will enter into the reduced-power mode comprises receiving the indication from the first network node over an active port of the first network node.

3. The method according to claim 1, wherein the route advertisement for the first network node includes non-zero-cost links to adjacent network nodes.

4. The method according to claim 1, wherein the route advertisement indicates that the third node is connected to the second network node and that the third node is reachable in the network.

5. The method according to claim 4, further comprising:
   receiving, by the second network node, an indication that network traffic is to be forwarded through the third node; and
   causing, by the second network node, the first network node to emerge from the reduced-power mode to an active mode.

6. The method according to claim 5, further comprising:
   in response to the receiving of the indication by the second network node that network traffic is to be forwarded through the third node, access, by the second network node, data that correlates the identifier of the third node to an identifier identification of the first network node, wherein the causing of the first network node to emerge from the reduced-power mode to the active mode is in response to the data that correlates the identifier of the third node to the identifier of the first network node.

7. The method according to claim 5, wherein the causing of the first network node to emerge from the reduced-power mode to the active mode is performed in response to a node failure.

8. The method of claim 1, wherein the route advertisement includes information relating to a metric of the third node, the information relating to the metric discouraging use of the third node for forwarding network traffic.

9. The method according to claim 8,
wherein the information relating to the metric of the third node includes a factor from a group consisting of bandwidth usage of the third node and a load of the third node, and
wherein the factor is configured to direct traffic away from the third node.

10. The method of claim 1, wherein the route advertisement communicated by the second network node to the network comprises mode information specifying that the first network node is in the reduced-power mode.

11. The method according to claim 1, wherein the identifier of the third network node includes an element from a group consisting of: a Media Access Control (MAC) address and an Internet Protocol (IP) address that does not exist in the network.

12. A first network node comprising:
a memory storing machine readable instructions to:
receive an indication from a second network node that the second network node will enter into a reduced-power mode;
generate an advertisement that signals the existence of a port of the second network node and that the port of the second network node is reachable in a network, wherein the advertisement includes an identifier of a port of a third network node that is not present in the network; and
communicate, to the network, the advertisement that signals the existence of the port of the second network node such that the first network node operates as a proxy advertiser for the second network node that has entered into the reduced-power mode; and
a processor to execute the machine readable instructions.

13. The first network node according to claim 12, wherein the machine readable instructions are further to:
broadcast, to the network, the route advertisement.

14. The first network node according to claim 12, wherein the memory stores machine readable instructions to generate the advertisement to include an identifier of the third node that includes an element from a group consisting of: a Media Access Control (MAC) address and an Internet Protocol (IP) address that does not exist in the network.

15. The first network node according to claim 12, wherein the memory stores machine readable instructions to cause the second network node to exit the reduced-power mode in response to traffic directed to the third network node.

16. A non-transitory computer readable storage medium on which is stored machine readable instructions, said machine readable instructions comprising code to, when executed by a processor:
receive an indication that a first network node in a network will enter into a reduced-power mode;
generate a signal that identifies the first network node as a third network node that is not in the network, wherein the information indicates that the first network node is reachable in the network; and
communicate the signal to the network.

17. The non-transitory computer readable storage medium according to claim 16, said machine readable instructions further comprising code to:
broadcast the signal to the network for receipt by network nodes as a route advertisement.

18. The non-transitory computer readable storage medium according to claim 16, wherein the signal is communicated to the network while the first network node is in the reduced-power mode, the signal comprising an identification of the third network node but not an identification of the first network node.

* * * * *